(12) United States Patent
Ohmi et al.

(10) Patent No.: US 7,673,649 B2
(45) Date of Patent: Mar. 9, 2010

(54) VACUUM THERMAL INSULATING VALVE

(75) Inventors: Tadahiro Ohmi, 1-17-301, Komegahukuro 2-chome, Aoba-ku, Sendai-shi, Miyagi 9800813 (JP); Yukio Minami, Osaka (JP); Kenji Tubota, Osaka (JP); Tsutomu Shinohara, Osaka (JP); Michio Yamaji, Osaka (JP); Nobukazu Ikeda, Osaka (JP); Akihiro Morimoto, Osaka (JP); Koji Kawada, Osaka (JP); Toshio Nariai, Osaka (JP)

(73) Assignees: Fujikin Incorporated, Osaka (JP); Tadahiro Ohmi, Miyagi (JP)

( * ) Notice: Subject to any disclaimer, the term of this patent is extended or adjusted under 35 U.S.C. 154(b) by 225 days.

(21) Appl. No.: 10/597,303

(22) PCT Filed: Jan. 13, 2005

(86) PCT No.: PCT/JP2005/000265

§ 371 (c)(1),
(2), (4) Date: Sep. 24, 2008

(87) PCT Pub. No.: WO2005/071299

PCT Pub. Date: Aug. 4, 2005

(65) Prior Publication Data

US 2009/0032115 A1 Feb. 5, 2009

(30) Foreign Application Priority Data

Jan. 22, 2004 (JP) .............................. 2004-014032

(51) Int. Cl.
*B65D 81/20* (2006.01)
(52) U.S. Cl. ................ 137/382; 137/341; 137/377; 220/592.2; 220/592.27; 220/799; 220/806; 220/62.18

(58) Field of Classification Search ................. 137/341, 137/375, 377, 382; 220/62.18, 592.2, 592.27, 220/799, 806
See application file for complete search history.

(56) References Cited

U.S. PATENT DOCUMENTS 3,674,169 A * 7/1972 Miller ....................... 220/4.21

(Continued)

FOREIGN PATENT DOCUMENTS

| JP | 56-113879 A | 9/1981 |
|---|---|---|
| JP | 59-20460 Y2 | 6/1984 |
| JP | 61-262295 | 11/1986 |
| JP | 8-233192 A | 9/1996 |
| JP | 10-299943 A | 11/1998 |

OTHER PUBLICATIONS

International Search Report Issued in the Corresponding International Application PCT/JP2005/000265, Completed Apr. 5, 2005 and Mailed Apr. 26, 2005.

*Primary Examiner*—John Rivell
*Assistant Examiner*—Jeremy S Baskin
(74) *Attorney, Agent, or Firm*—Griffin & Szipl, P.C.

(57) ABSTRACT

The present invention provides a vacuum thermal insulating valve that may be used at high temperature in gas supply systems or gas exhaust systems, and also may be made substantially small and compact in size owing to its excellent thermal insulating performance. With a vacuum thermal insulating valve comprising a valve equipped with a valve body and an actuator, and a vacuum thermal insulating box that houses the valve, the afore-mentioned vacuum thermal insulating box S is formed by a square-shaped lower vacuum jacket S5 having a cylinder-shaped vacuum thermal insulating pipe receiving part J on a side and with its upper face made open, and the square-shaped upper vacuum jackets S4, which is hermetically fitted to the lower vacuum jacket S5 and with its lower face made open.

10 Claims, 15 Drawing Sheets

U.S. PATENT DOCUMENTS

| | | | | |
|---|---|---|---|---|
| 4,562,857 A | * | 1/1986 | Ball | 137/375 |
| 4,890,638 A | * | 1/1990 | Davenport | 137/382 |
| 5,957,156 A | * | 9/1999 | Hartley | 137/377 |
| 6,168,040 B1 | * | 1/2001 | Sautner et al. | 220/592.1 |
| 6,260,725 B1 | * | 7/2001 | Gonzales et al. | 220/4.21 |
| 6,362,419 B1 | * | 3/2002 | Gallagher et al. | 174/37 |
| 2004/0089344 A1 | * | 5/2004 | Kanzaka et al. | 137/341 |

* cited by examiner

PRIOR ART

PRIOR ART

PRIOR ART

Distance from the inner wall face (mm)

VACUUM THERMAL INSULATING VALVE

This is a National Phase Application in the United States of International Patent Application No. PCT/JP2005/000265 filed Jan. 13, 2005, which claims priority on Japanese Patent Application No. JP 2004-014032, filed Jan. 22, 2004. The entire disclosures of the above patent applications are hereby incorporated by reference.

FIELD OF THE INVENTION

The present invention is concerned with improvements in a vacuum thermal insulating valve employed in a pipe passage for a gas supply system, or a gas exhaust system, mainly in semiconductor manufacturing facilities or chemical plants.

BACKGROUND OF THE INVENTION

With a gas supply system with which liquefied gas is vaporized, it has been conventionally practiced to heat the pipe passage to more than a specified temperature to prevent the supply gas from re-condensing in the pipe passage. Similarly, with a gas exhaust system in semiconductor manufacturing facilities, plasma generating apparatuses and the like, the pipe passages, valve devices mounted thereon, and the like, have been heated to prevent exhaust gas from forming gas condensation in the pipe passage.

For example, the internal pressure of a process chamber for semiconductor manufacturing facilities can be kept evacuated to approximately $10^{-4}$ to $10^2$ torr, depending on the type of the process, by making the exhaust side of the chamber continuously exhausted by a vacuum pump. On the other hand, because necessary treatments are performed by using various kinds of corrosive gases or toxic gases, a large amount of corrosive gases, and the like, are found in the exhaust gases passing through the exhaust system. Accordingly, for an exhaust system for the process chamber, condensation of the corrosive gas is prevented by heating pipe passages or valve units; thus, the devices constituting the exhaust system are prevented from corrosion because corrosive effects are substantially increased when corrosive gases liquefy due to condensation.

Also, with semiconductor manufacturing facilities, it is strongly desired that the entire unit, including the exhaust system of the process chamber, be further downsized. Therefore, for the vacuum exhaust system of the process chamber, it is also strongly desired to make small the diameter of the exhaust pipe passage, downsize the vacuum exhaust pumps, downsize valves to be employed, and the like are, and ideas to realize these desires have been studied. Particularly, for the vacuum exhaust system, more effort has been made to further downsize the pipe passages and valves by enhancing their thermal insulating performance.

With regard to the pipe passages of the vacuum exhaust system in semiconductor manufacturing facilities and the like, the initial objective has been nearly achieved by employing a vacuum thermal insulating pipe passage. However, with regard to a valve unit that constitutes a vacuum exhaust system, there remain many unsolved problems, such as thermal insulating capabilities, downsizing, energy-saving and the like.

Though the explanation given here is with regard to problems related to the vacuum exhaust system for semiconductor manufacturing facilities, it goes without saying, however, that such problems have some similarities with the problems of the gas supply system on the upstream side, and the gas supply system or gas exhaust system in other chemical apparatuses, and the like. Accordingly, the gas supply system, exhaust system for semiconductor manufacturing facilities, and the like, are used as examples to explain these problems as follows.

A so-called "unit-type valve" V, constituted as shown in FIG. 17 to FIG. 20, has been widely used for semiconductor manufacturing facilities and the like to make a valve that is small and compact. For example, the unit-type valve V shown in FIG. 17 and FIG. 18 has outer dimensions of 150~500 mm in breadth, 130~150 mm in height, and 80~100 in depth. In particular, the valve V is made of a valve unit body $V_1$ formed by combining a plural number of valve bodies $V_{10}$, $V_{20}$ . . . , and actuators D mounted on the valve bodies $V_{10}$, $V_{20}$ . . . , respectively. The valve itself, as a unit, is a metal diaphragm type valve comprising the valve body $V_{10}$ and the actuator D. The afore-mentioned valve V is heated to normally approximately 150° C. by a heater (not illustrated) to prevent corrosive gases passing through the inside from condensing.

The heated valve V is of a very compact structure, and its temperature is held at less than a temperature (approximately 40° C.) that allows it to be touched by hands from the outside. And, heated valve V needs thermal insulation so that leakage of heat directly to the outside is prevented. In the case where rock wool is used as a thermal insulating material, the thickness of the wool needed for one side will be 30 to 50 mm, thus making it difficult to compact-size the valve V.

Similarly, in the case where the valve V is made to be enclosed by a pneumatic thermal insulation type box body (equipped with a silver-plated layer to suppress heat transfer by radiation on the inner wall surface and made with an air layer of 10 mm) of a double wall structure, it was difficult to reduce the temperature of the outer surface of the thermal insulating box to less than approximately 40° C. because of heat transfer by convection of the air layer.

Therefore, first, the inventors of the present invention developed a vacuum thermal insulating valve, which was made to house a valve unit body $V_1$ of the valve inside a vacuum thermal insulating box S, by making use of vacuum thermal insulation as shown in FIG. 21. It was learned, however, that the vacuum thermal insulating valve in FIG. 21 was not commercially practical because the temperature of the outer surface (i.e., the surface temperature of the actuator in the center part) became higher than the specified temperature (40° C.).

Therefore, inventors of the present invention formed a vacuum thermal insulating box S made by combining 3 vacuum jackets $S_1$, $S_2$, $S_3$ as shown in FIG. 22 to FIG. 25, and conducted various kinds of tests using this box. In FIG. 22 to FIG. 25, the main reasons why the vacuum thermal insulating box S is divided into 3 vacuum jackets $S_1$, $S_2$, $S_3$, or the first, second and third vacuum jackets, are that a vacuum thermal insulating pipe receiving part J can be easily fabricated and also the solid heat transfer distance can be made longer this way. In FIG. 22 to FIG. 25, K designates a silicon sponge-made thermal insulating layer (thickness t=2 mm), H a plane heater, G a getter case, J a vacuum thermal insulating pipe receiving part, O a seal-off valve, Q a cable takeout opening, and OUT and IN are temperature measuring points. Furthermore, in FIG. 22 to FIG. 25, a 2 mm-thick stainless steel plate is used for the metal plate that constitutes vacuum jackets $S_1$, $S_2$, $S_3$. The entire inner wall faces of the vacuum jackets $S_1$ to $S_3$ are given electroless Ag plating, and then a vacuum heating treatment of 550° C.×2 hrs is conducted on the silver plating layer to enhance its emissivity.

With FIG. 25, other temperature measuring points are shown beside temperature measuring points IN and OUT in the afore-shown FIG. 22 to FIG. 24. FIG. 26 and FIG. 27 show the results of temperature measurements at each measuring point of the first vacuum jacket $S_1$ and the second vacuum jacket $S_2$.

On the other hand, the thermal insulating performance of 2 vacuum thermal insulating boxes S can be demonstrated by the electric power required to hold the inside of the vacuum thermal insulating boxes S at the specified temperature used for comparison. First, the inventors of the present invention made adjustable the voltage to be applied to a plane heater H (100V·200 W·50Ω×2 pieces), and at the time when the temperature of the valve unit body $V_1$ reached equilibrium (approx. 3 hours after the start of heating), power consumption was measured both under conditions when the vacuum thermal insulating box S was inserted, and the vacuum thermal insulating box S was not inserted, respectively.

It was learned that while input power was 81 W (stabilized at 150° C. at 45V, thus input power $W=45^2/50\times2=81$ W) when the vacuum thermal insulating box S was inserted, input power was 213 W (stabilized at 150° C. at 73V, thus input power $W=73^2/50\times2=213$ W) when the vacuum thermal insulating box S was not inserted. These results revealed that input power can be reduced to 81/213 owing to the thermal insulating performance of the vacuum thermal insulating box S.

Consumption power W, with which the thermal insulating performance of the afore-mentioned vacuum insulating box S is estimated, can be calculated by the operating time and operating voltage of the relay of the temperature controller that supplies power to the plane heater H because the power supplied to the plane heater H is proportional to the output voltage of the relay of the temperature controller. Thus, supply power to the plane heater H can be determined by measuring output voltage and output time of the relay of the temperature controller with an oscillogram, and by obtaining the peak area (the peak integration value) by making use of the integration function of the peak area of the oscillogram. Specifically, because the afore-mentioned peak area (a peak integration value) is equal to the output voltage×output time, it is determined that output time=the peak integration value/the output voltage, and the output %=output time×100/the measuring time=the peak integration value×100/(the measuring time×the output voltage).

For example, assuming that the output voltage of the relay of the temperature controller is 12V and the measuring time 50 seconds, it is determined that the output %=the peak integration value×100/(12×50)=the peak integration value/6.

According to test results, the peak integration value (the average of 5 points) of the oscillogram at the time when the temperature of the valve unit body $V_1$ was in a stable state at 150° C., with the vacuum thermal insulating box S inserted, was 119.0 (V·sec) taking the average. Accordingly, the output % at this time becomes 119/6=19.83%. With a rated capacity of the plane heater H of 400 W, the output of the plane heater H becomes 400 W×19.83%=79.3 W. The peak integration value (the average of 5 points) of the oscillogram at the time when the temperature of the valve unit body $V_1$ was in a stable state at 150° C., with the vacuum thermal insulating box S removed, was 331.6 (v·sec). Accordingly, the output % at this time becomes 331.6/6=55.27%. Thus, the output of the plane heater H becomes 400 W×55.27%=221.1 W.

When the input power ratio (the case where the vacuum thermal insulating box was in use/the case where the vacuum thermal insulating box was not in use=81/213) determined by the afore-mentioned voltage adjustment is compared with the output power ratio (79.3/221.1) determined by the peak integration value on the oscillogram, it was learned that there exists almost no difference between them. Because thermal insulating performance of a vacuum thermal insulating box S can be measured easier with the former method, wherein the input voltage to the plane heater H is adjusted, for embodiments of the present invention, the verification test for the vacuum insulating characteristics is conducted using the method of adjusting the input voltage.

In the case where the vacuum insulating box S, according to the combination of 3 vacuum jackets $S_1$, $S_2$, $S_3$ is used as shown in FIG. 22 to FIG. 25, thermal insulating performance expressed by the ratio of input voltage to the plane heater H is 81/213, which is not a sufficient performance.

Another problem encountered is that the thermal insulating performance is lowered because the vacuum thermal insulating box S in FIG. 22 to FIG. 25 is structured by combining 3 segments, which leads to high thermal conductivity by solid heat transfer.

Furthermore, another problem with the afore-mentioned vacuum thermal insulating box S shown in FIG. 22 to FIG. 25 is that, because a 2 mm-thick stainless steel plate is employed from the view point of providing mechanical strength, thermal conductivity by solid heat transfer becomes relatively high.

Patent Document: TOKU-KAI-SHO No. 61-262295 Public Bulletin

OBJECT OF THE INVENTION

It is a primary object of the present invention to solve the afore-mentioned problems with a vacuum thermal insulating box S, which basic development was performed by inventors of the present invention, as shown in FIG. 22 to FIG. 25, that has (a) insufficient thermal insulating performance, (b) a substantial decrease in the thermal insulating performance by solid heat transfer due to the reason that 3 segments are combined. Another primary object of the present invention is to provide a vacuum thermal insulating valve that is small-sized and equipped with the high thermal insulating performance, and is made by combining a jacket-type vacuum thermal insulating box S with better thermal insulating performance by using 2 vacuum jacket segments and a valve V.

SUMMARY OF THE INVENTION

The present invention in accordance with a first embodiment is fundamentally constituted so that, with the vacuum thermal insulating valve formed by a valve equipped with a valve body and an actuator, and a vacuum thermal insulating box that houses this valve, the afore-mentioned vacuum thermal insulating box S comprises a square-shaped lower vacuum jacket $S_5$ equipped with a cylinder-shaped vacuum thermal insulating pipe receiving part on its side, and also with an upper face that is made open, and a square-shaped upper vacuum jacket $S_4$ hermetically fitted to the lower vacuum jacket $S_5$ from the above, and also with a lower face that is made open; and the jointed part $2d'$ is formed by bending the inner wall $8b$ and the outer wall $8a'$ of the upper end of the afore-mentioned lower vacuum jacket $S_5$ toward the inside in the shape of a brim, and also the jointed part $2d$ is formed by bending the center part of the height direction of the side of the lower vacuum jacket $S_5$ toward the outside in the shape of a brim, and further the jointed part $2c$ is formed by bending the inner wall $7b$ and the outer wall $7a$ of the lower end of the afore-mentioned upper vacuum jacket $S_4$ toward the outside in the shape of a brim, and both are combined in a manner that the vacuum thermal insulating side wall of the upper vacuum jacket $S_4$ is positioned toward the outside of the vacuum thermal insulating side wall of the afore-mentioned lower vacuum jacket $S_5$, to make the jointed part $2c$ of the lower end of the afore-mentioned upper vacuum jacket $S_4$ and the jointed part 2*d* of the outer wall side of the lower vacuum jacket $S_5$ hermetically sealed by installing thermal insulating material layer K, and also to make the jointed part 2*d'* of the inner wall 7*b* of the ceiling part of the upper vacuum jacket $S_4$ and the upper end of the lower vacuum jacket $S_5$ hermetically sealed by installing thermal insulating material layer K.

The present invention in accordance with a second embodiment modifies the first embodiment so that the valve V is equipped with a valve unit body $V_1$ made by a plural number of valve bodies $V_{10}, V_{20}$ . . . that are integrally connected.

The present invention in accordance with a third embodiment modifies the first embodiment so that a heater H is mounted on the valve body, and the heater H is made to be a plane heater fixed to the valve body.

The present invention in accordance with a fourth embodiment modifies the first embodiment so that the valve body has an outer surface to which a plane heater H is fixed and an inner part equipped with a valve seat and a valve seat part.

The present invention in accordance with a fifth embodiment modifies the first embodiment so that the thermal insulating material layer K is made of a silicon sponge.

The present invention in accordance with a sixth embodiment modifies the first embodiment so that the outer wall 7*a* of the upper vacuum jacket $S_4$ is 2 mm thick and its inner wall 7*b* is 1.5 mm thick, and the inner wall 8*b* of the lower vacuum jacket $S_5$ is 2 mm thick and the lower part 8*a* of its outer wall is 2 mm thick and the upper part 8*a'* of the side wall of the outer wall is 1.5 mm thick, and each wall is made of stainless steel so that deformation of the flat plate is prevented at the time of evacuation by such thickness.

The present invention in accordance with a seventh embodiment modifies the first embodiment so that the vacuum thermal insulating pipe receiving part J installed on the side of the lower vacuum jacket $S_5$ is made to be a 50 mm to 150 mm long cylinder-shaped vacuum jacket made of a 2 mm-thick stainless steel plate, and O-rings 4*a*, 4*b* made of thermal insulating material are placed on the peripheral face of one end or both ends of a tip part 3*a* of the vacuum thermal insulating pipe 3 to be inserted into the vacuum thermal insulating pipe receiving part from the outside, and the aforementioned O-rings 4*a*, 4*b* made of thermal insulating material are caught between the vacuum thermal insulating pipe receiving part J and the tip part 3*a* thereof.

The present invention in accordance with an eighth embodiment modifies the first embodiment so that the jointed parts 2*c*, 2*d* in the shape of a brim of the side walls of the upper and lower vacuum jackets $S_4$, $S_5$ combined in an opposite direction are pressed by a plural number of press-clips 5 with an appropriate space.

The present invention in accordance with a ninth embodiment modifies the first embodiment so that a height of an overlapped part W, in combination with the upper and lower vacuum jackets $S_4$, $S_5$ that form the side wall of the vacuum thermal insulating box S, is made to be more than 100 mm.

The present invention in accordance with a tenth embodiment modifies the first embodiment so that the inner wall face of the vacuum thermal insulating spaces 2*a*, 2*b*, 2*b'* of the upper and lower vacuum jackets $S_4$, $S_5$ undergoes heat treatment after plating.

EFFECTS OF THE INVENTION

With the present invention, a vacuum thermal insulating box S is formed by combining upper and lower vacuum jackets $S_4$, $S_5$, and the length of the overlapped part W, with the combination of both jackets, is made to be more than approximately one half of the height (e.g., more than approximately 100 mm) of the vacuum thermal insulating box S, and the thickness of the wall material 7*b*, 7*a'* on the one part which forms the afore-mentioned overlapped part W of both vacuum jackets $S_4$, $S_5$ is made to be thinner than the thickness of the wall material on the other part, thus considerably enhancing the vacuum thermal insulating performance due to a substantial decrease in solid heat transfer volume.

Also, in accordance with the present invention, a silicon sponge made thermal insulating layer K is employed so that hermeticity of the overlapped part, formed by the combination of both vacuum jackets $S_4$, $S_5$, is enhanced and solid heat transfer is reduced. Thus, a higher thermal insulating performance is assured due to the fact that there is no heat leakage at all from the inside of the vacuum thermal insulating box S because the box is constituted such that the jointed parts 2*c*, 2*d*, 2*d'* are formed on end parts of both vacuum jackets $S_4$, $S_5$.

Furthermore, there is no chance at all that the gas condenses inside the valve unit body $V_1$ because the valve unit body employed is heated with the plane heater H, thus providing a vacuum thermal insulating valve that is small and compact in size and at lower cost.

LIST OF REFERENCE CHARACTERS AND NUMERALS

Figure 1:
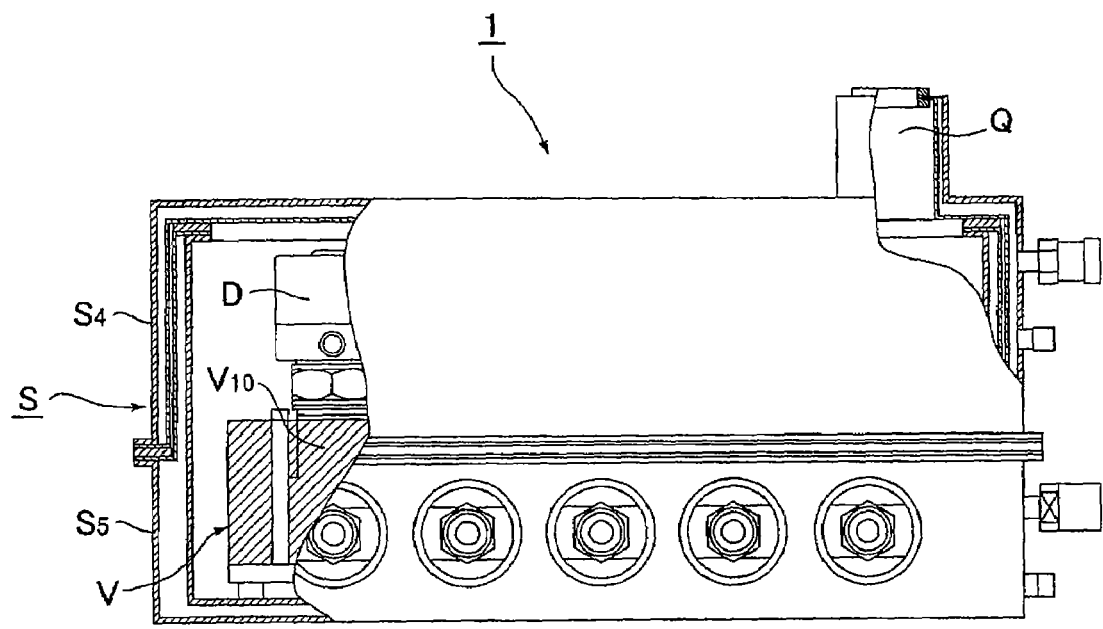
FIG. 1 is a partial cutaway front view of a vacuum thermal insulating valve in accordance with the present invention.

V Valve
$V_1$ Valve unit body
$V_{10}$ Valve body
$V_{20}$ Valve body
$V_{n0}$ Valve body
D Actuator
S Vacuum thermal insulating box
$S_1$ No. 1 vacuum jacket
$S_2$ No. 2 vacuum jacket
$S_3$ No. 3 vacuum jacket
$S_4$ Upper vacuum jacket
$S_5$ Lower vacuum jacket
W Overlapped part of the combination of the upper and lower vacuum jackets
J Vacuum thermal insulating pipe receiving part
K Silicon sponge made thermal insulating material layer
H Heater
G Getter case
O Shut-off valve
Q Cable takeout opening
OUT, IN Temperature measuring points
1 Vacuum thermal insulating valve
2a, 2b, 2b' Vacuum thermal insulating spaces
2c Jointed part of the lower end part of the upper vacuum jacket
2d Jointed part of the outer wall of the lower vacuum jacket
2d' Jointed part of the upper end part of the lower vacuum jacket
2e, 2f Welded part
3 Vacuum thermal insulating pipe
3a Tip part
3b, 3c Step parts
4a, 4b Thermal insulating material made O-ring
5 Press clip
6 Pipe heater
7a Outer wall of the upper vacuum jacket
7b Inner wall of the upper vacuum jacket
8a Outer wall of the lower vacuum jacket
8a' Outer wall above from the center part of the lower vacuum jacket
8b Inner wall of the lower vacuum jacket
9 Metal pipe
10 Pipe fitting

DETAILED DESCRIPTION OF THE INVENTION

Figure 2:
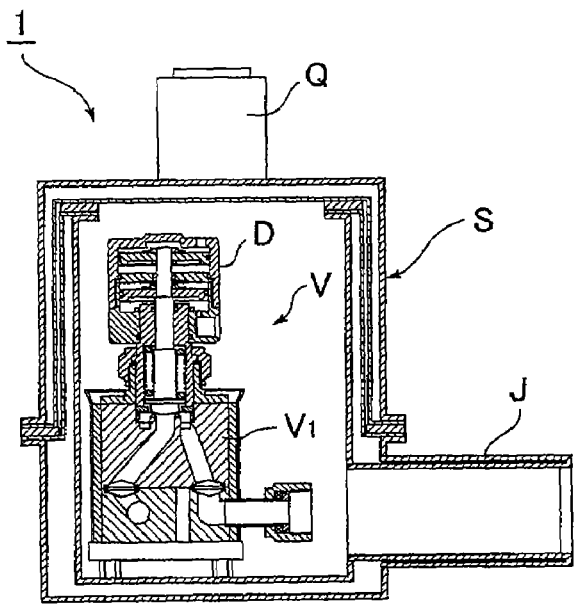
FIG. 2 is a left side view of FIG. 1.
Figure 3:
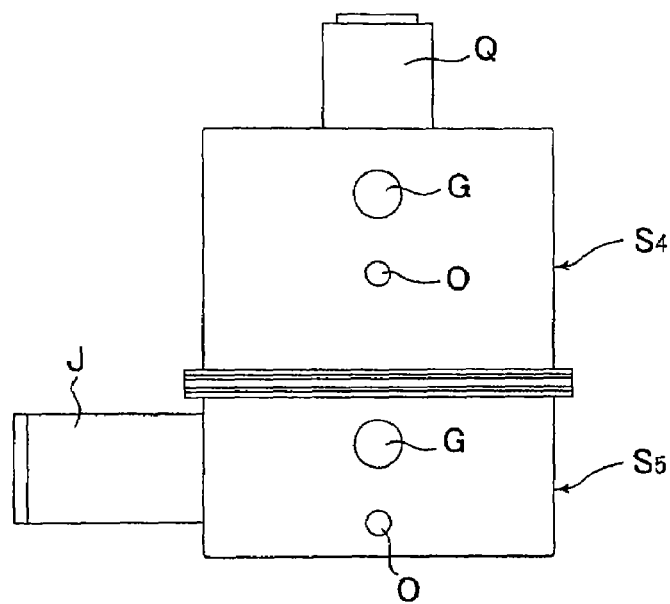
FIG. 3 is a right side view of FIG. 1.
Figure 4:
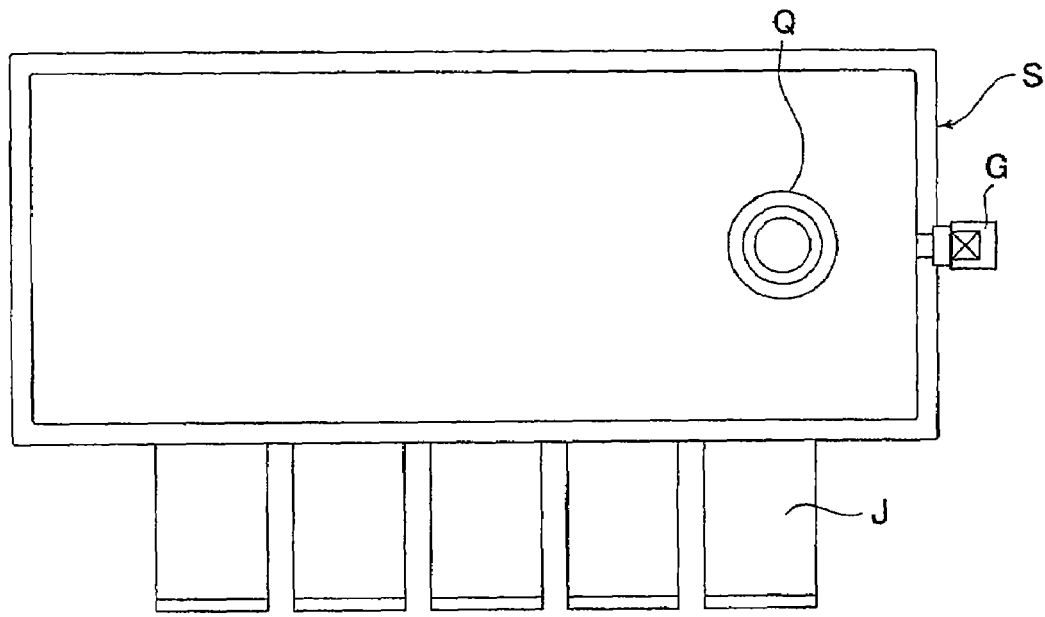
FIG. 4 is a plan view of FIG. 1.
Figure 5:
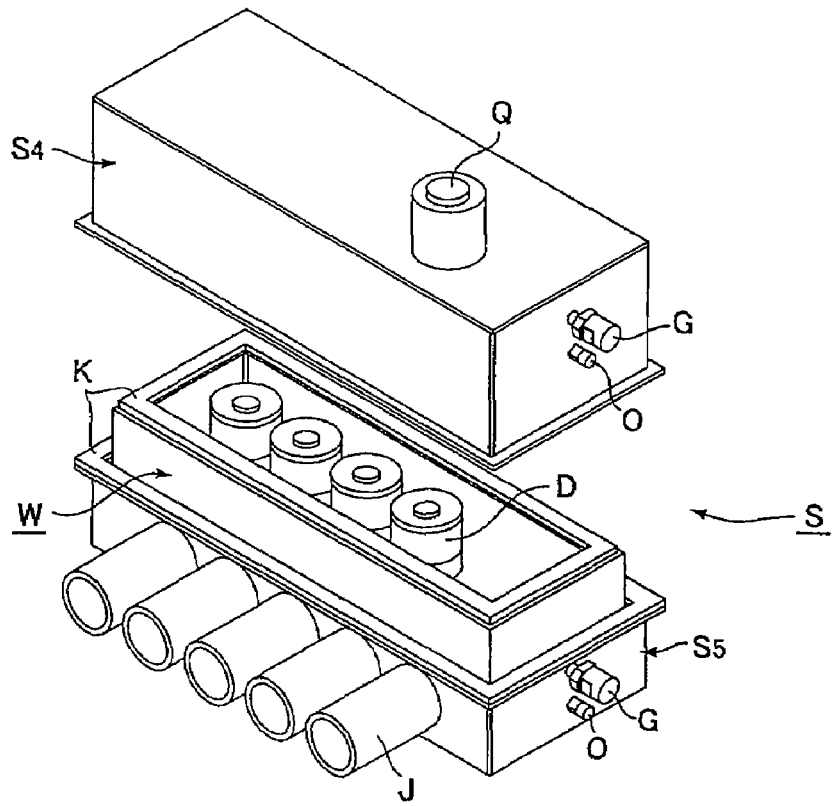
FIG. 5 is a perspective view of a vacuum thermal insulating box that forms a vacuum thermal insulating valve in accordance with the present invention.

The following embodiments in accordance with the present invention are described with reference to the drawings as follows. FIG. 1 is a partial cutaway front view of a vacuum thermal insulating valve in accordance with the present invention. FIG. 2 is its left side view, FIG. 3 is its right side view, and FIG. 4 is its plan view. FIG. 5 is a perspective view of a vacuum thermal insulating box S in accordance with the present invention.

Referring to FIG. 1 to FIG. 5, a vacuum thermal insulating valve 1, in accordance with the present invention, comprises a valve V and a vacuum thermal insulating box S that surrounds the valve V. The afore-mentioned valve V comprises a valve unit body $V_1$ and a plural number of actuators D and heaters. Furthermore, the vacuum thermal insulating box S comprises an upper vacuum jacket $S_4$ and a lower vacuum jacket $S_5$.

Embodiment 1

Figure 15:
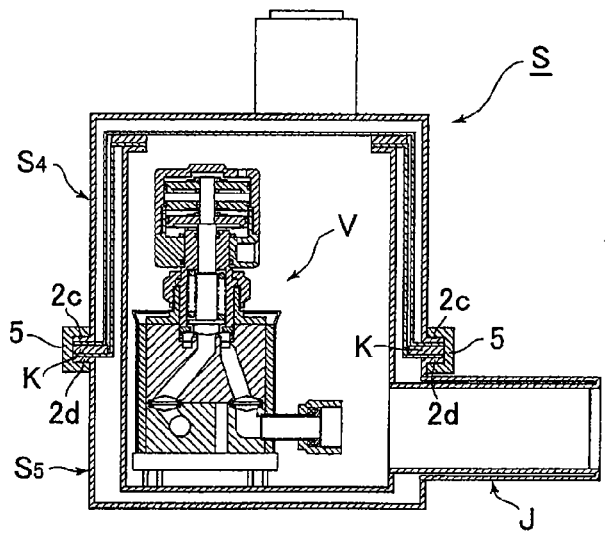
FIG. 15 is a cross-sectional view showing the jointed part of the upper jacket and the lower jacket.
Figure 17:
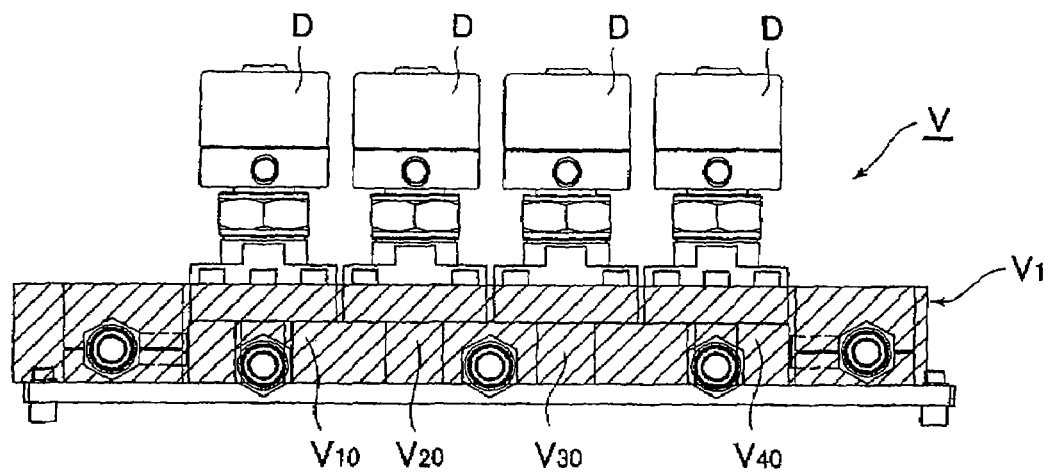
FIG. 17 is a front view of an example of a unit valve that forms the present invention.
Figure 18:
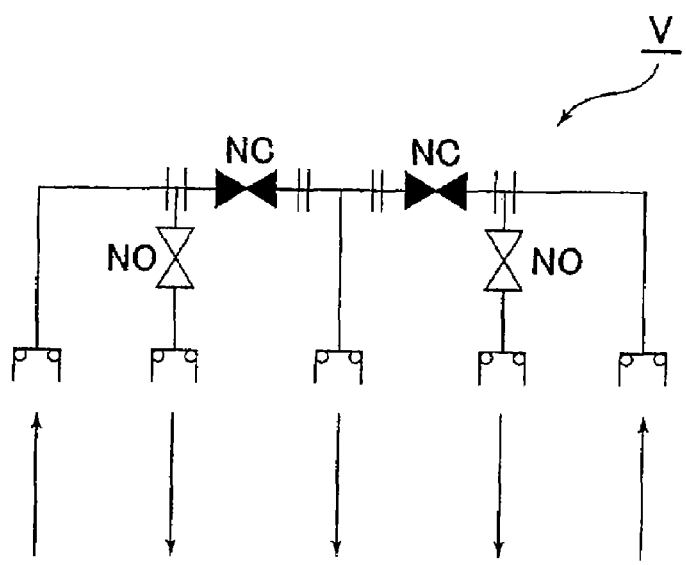
FIG. 18 is a block diagram of the flow passage in FIG. 17.
Figure 19:
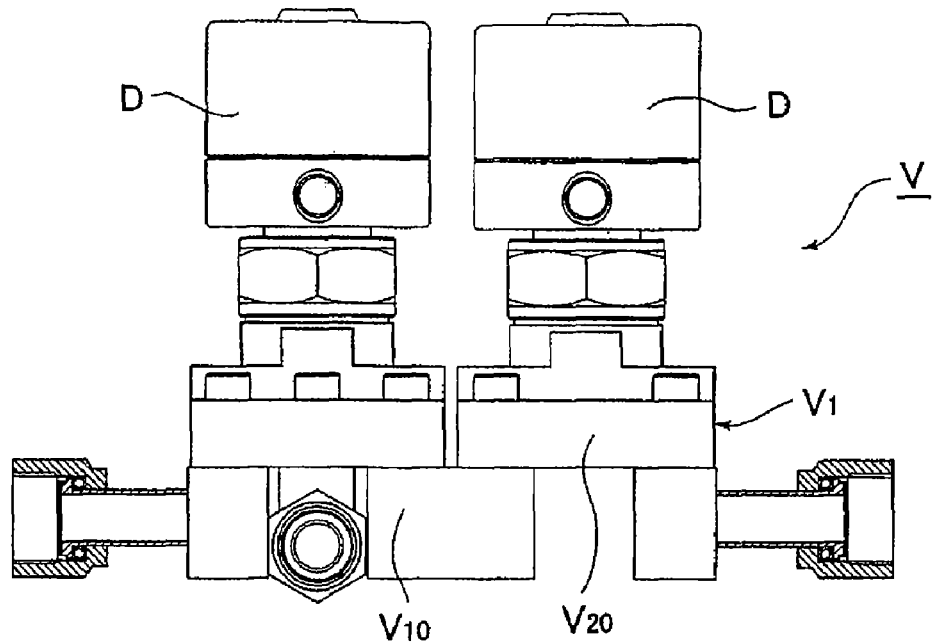
FIG. 19 is a front view showing another example of a unit valve that forms the present invention.
Figure 20:
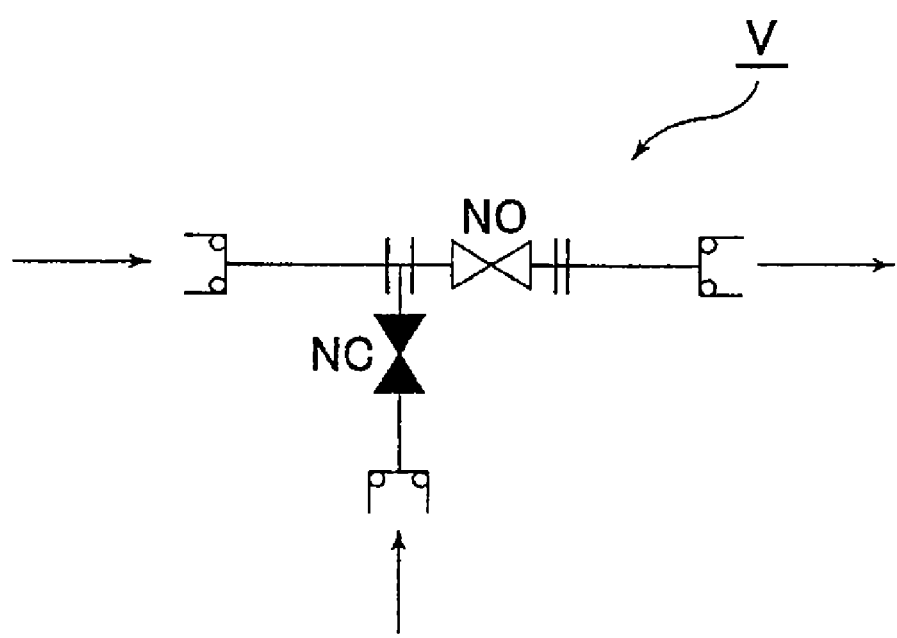
FIG. 20 is a block diagram of the flow passage in FIG. 19.
Figure 21:
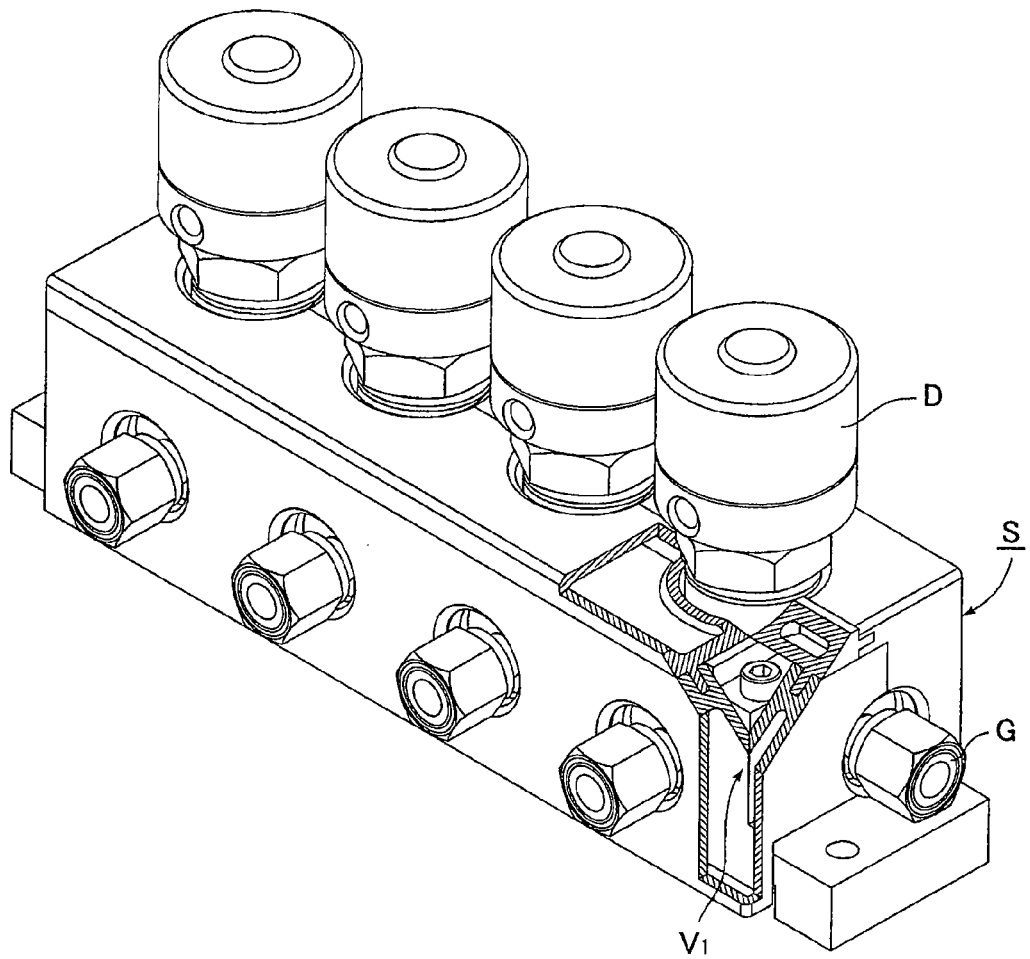
FIG. 21 is a perspective view of an example of a vacuum thermal insulating box.
Figure 22:
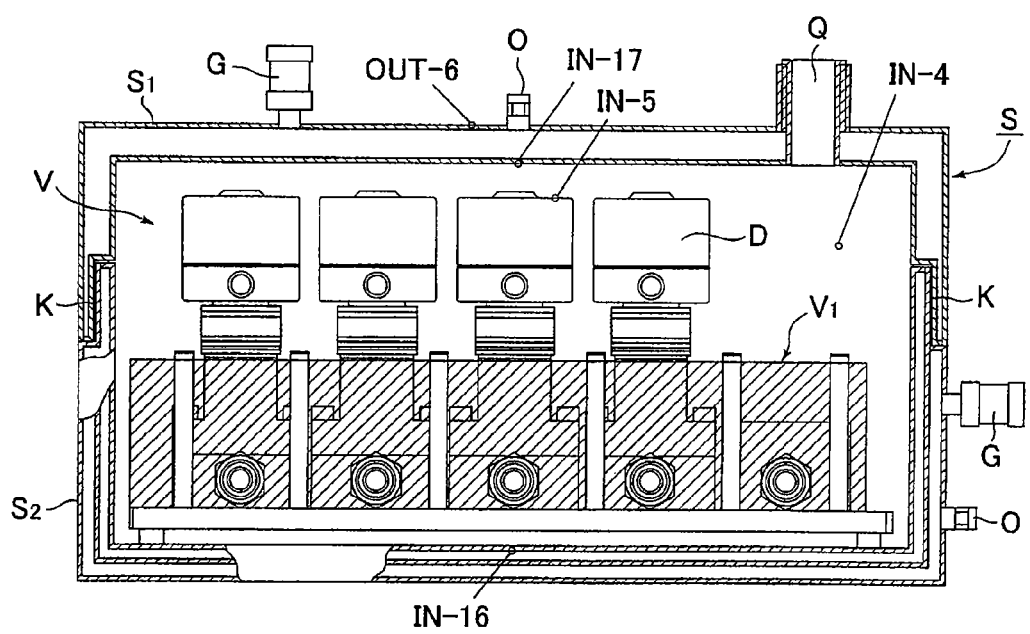
FIG. 22 is a front view of the vacuum thermal insulating box that is formed of 3 vacuum jackets.
Figure 23:
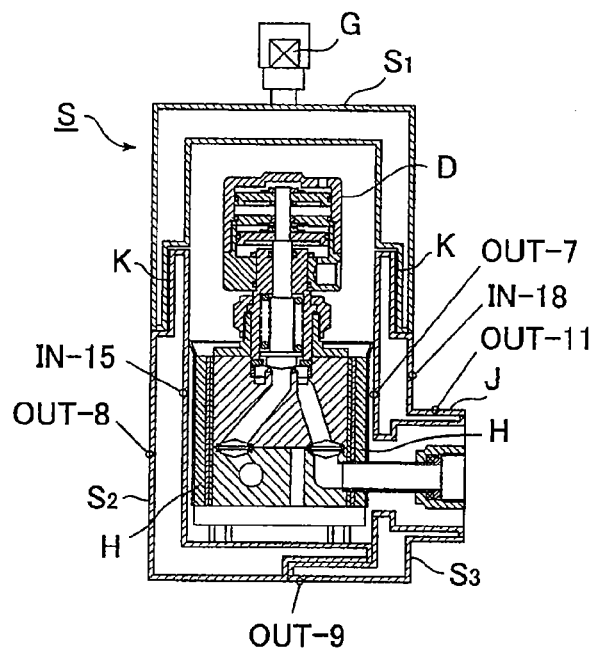
FIG. 23 is a left side view of the vacuum thermal insulating box shown in FIG. 22.
Figure 24:
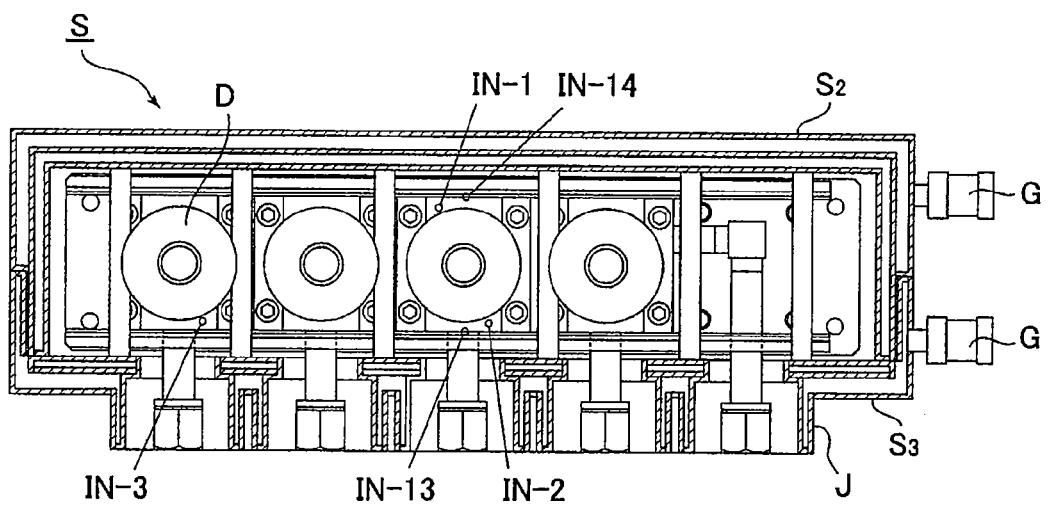
FIG. 24 is a plan view of the vacuum thermal insulating box shown in FIG. 22.
Figure 25:
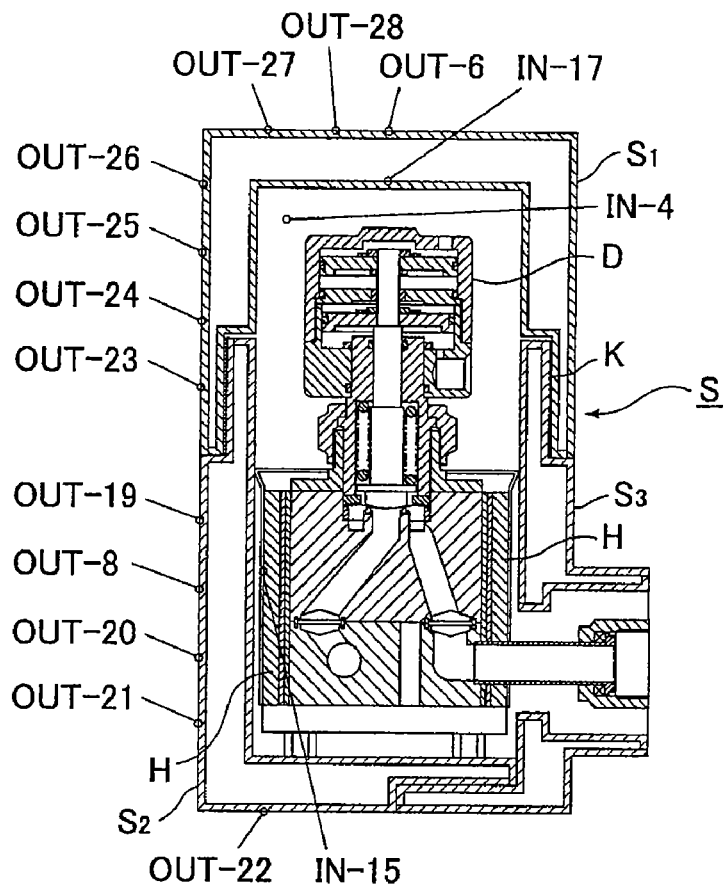
FIG. 25 is a drawing showing the measuring points of the vacuum thermal insulating box shown in FIG. 22.
Figure 26:
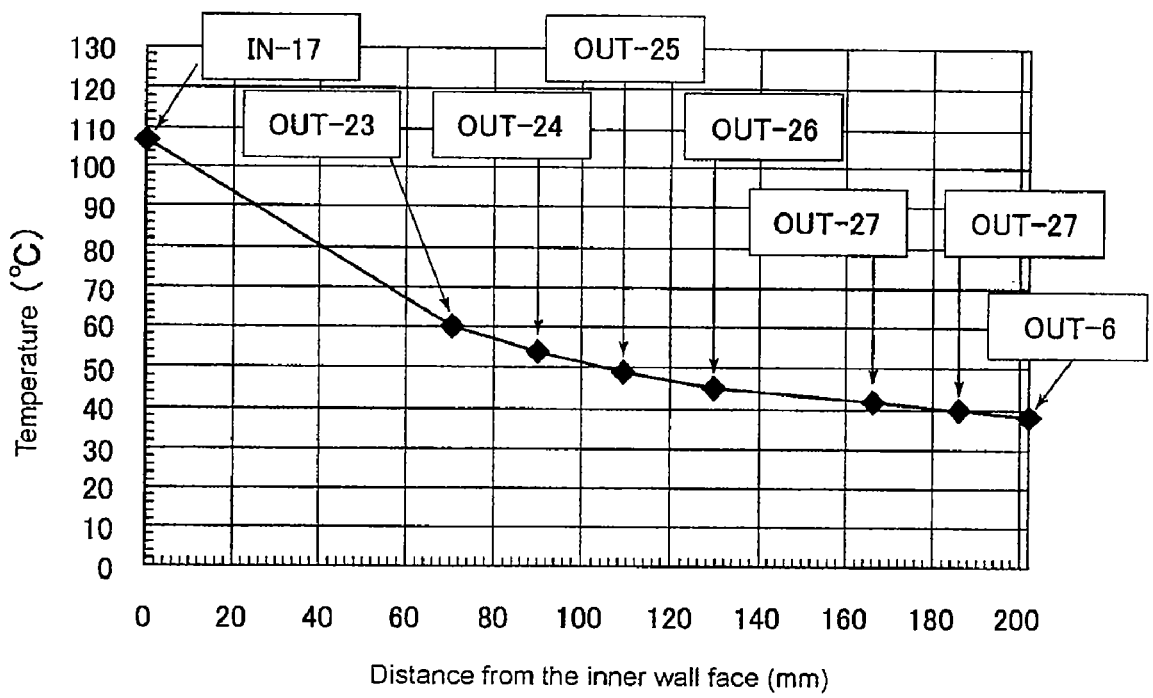
FIG. 26 is a diagram showing the relationship between temperature of the measuring points of the vacuum thermal insulating box and the distance from the inner wall face shown in FIG. 22. (No. 1 vacuum jacket)
Figure 27:
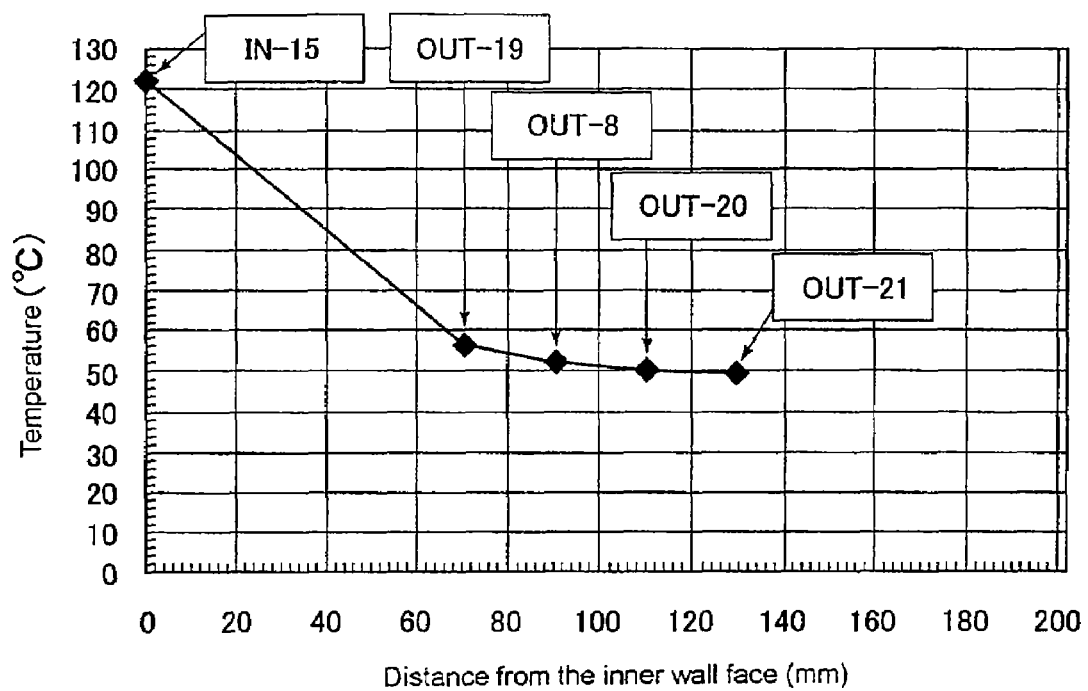
FIG. 27 is a diagram showing the relationship between temperature of the measuring points of the vacuum thermal insulating box and the distance from the inner wall face shown in FIG. 22. (No. 2 vacuum jacket)

As shown in FIG. 15 and FIG. 17, the afore-mentioned valve V comprises a valve unit body $V_1$ that is formed by connecting, removably and integrally, a plurality of valve bodies $V_{10}$, $V_{20}$, $V_{30}$, and actuators D, D . . . and the like fixed to the valve bodies $V_{10}$, $V_{20}$, $V_{n0}$. A metal made diaphragm-type valve, which is already known, has been often employed for the fore-mentioned valve bodies $V_{10}$, $V_{20}$. Furthermore, a pneumatically operated cylinder, or an electrically operated driving mechanism, have been employed for actuators D, C . . . . Detailed explanation on the valve V is thus omitted herewith its structure is well known. Valve seats and valve seat parts of the valve bodies $V_{10}$, $V_{20}$, which are used with the present invention, are positioned on inner sides of the valve bodies $V_{10}$, $V_{20}$ so that they can be easily heated by the heater H.

Figure 6:
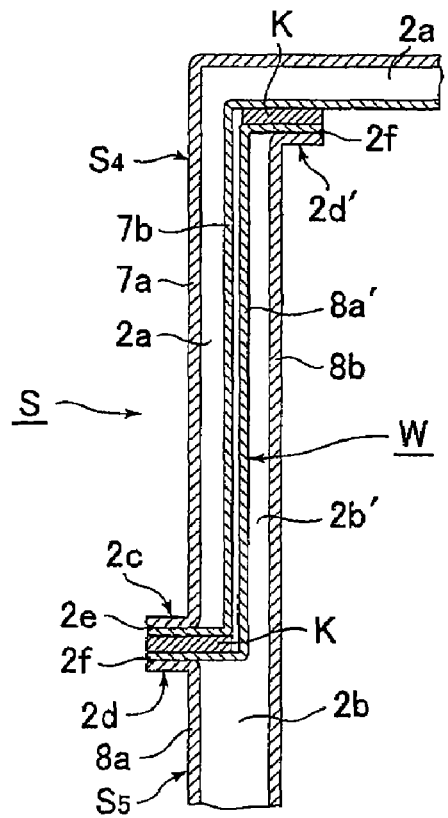
FIG. 6 is a partially enlarged perspective view of the part with the combination of a lower vacuum thermal insulating jacket and an upper vacuum thermal insulating jacket.

A vacuum thermal insulating box S is formed by combining and fixing an upper vacuum jacket $S_4$ and a lower vacuum jacket $S_5$. Specifically, as shown in FIG. 6, the upper vacuum jacket $S_4$ and the lower vacuum jacket $S_5$ are formed by combining a 1.5 mm thick stainless steel plate 7b, 8a' and a 2.0 mm thick stainless steel plate 8a, 8b in the shape of a dual wall. The vacuum thermal insulating space 2a (with an approximately 4.5 mm clearance) of the upper vacuum jacket $S_4$ is held at a degree of vacuum of approximately $10^{-2}$ to $10^{-4}$ torr. A degree of vacuum less than $10^{-4}$ torr under high temperature is held by a getter.

The clearance of the vacuum layer 2b of the lower part of the lower vacuum jacket $S_5$ is made to be 13 mm. The part W to which the upper vacuum jacket $S_4$ fits (i.e., the combined and overlapped part W of the upper and lower vacuum jackets $S_4$, $S_5$) has with the vacuum layer 2b' a space distance of approximately 4.5 mm. The height (that is, the heat transfer distance) of the fitted part (i.e., the combined and overlapped part W) of both vacuum jackets $S_4$, $S_5$, which constitutes the part affected by the heat transfer, is made to be approximately 100 mm.

More specifically, the outer wall 7a of the upper vacuum jacket $S_4$ is made to be 2 mm thick and the inner wall 7b is 1.5 mm thick, for which a stainless steel plate is used. On the other hand, the lower part (including the bottom face) of the outer wall 7b of the lower vacuum jacket $S_5$ is made to be 2 mm thick and the inner wall 8b is 2 mm thick, and the upper side wall (the overlapped part W) 8a' of the outer wall 8b is 1.5 mm thick, for which a stainless steel plate is used.

A getter case G and a shut-off valve O are mounted on the afore-mentioned upper vacuum jacket $S_4$ and lower vacuum jacket $S_5$, respectively. Furthermore, the former is equipped with a takeout opening Q for a cable and a valve driving air pipe, while the latter is equipped with a vacuum thermal insulating pipe receiving part (i.e., a joint) J for connecting a vacuum thermal insulating pipe (not illustrated).

The inner wall 7b and outer wall 7b, which form the lower end part of the afore-mentioned upper vacuum jacket $S_4$, are bent toward the outer side in the shape of a brim, and the jointed part 2c is formed in the shape of a brim by both being jointed. Similarly, the inner and outer walls 8b, 8a', which form the upper end part of the lower vacuum jacket $S_5$, are bent toward the inner side and the jointed part 2d' is formed in the shape of a brim. Furthermore, on the center part of the side wall of the lower vacuum jacket $S_5$, there is formed a jointed part 2d that is extruded toward the outside by bending the lower end part of the outer wall 8a' and the upper end part of the outer wall 8a toward the outside, respectively, and overlapping them.

The afore-mentioned end faces of the brim-shaped jointed parts 2c, 2d, 2d' extruded toward the outside are welded to make the welded parts 2e, 2f, thus hermetically fixed. Furthermore, as shown in FIG. 6, a silicon sponge-made thermal insulating material layer K is provided in the clearances made between the inner wall 7b of the vacuum jacket $S_4$ and the jointed part 2d', and also between the jointed parts 2d, 2c of both vacuum jackets $S_4$, $S_5$. Thus, the hermeticity between both vacuum jackets $S_4$, $S_5$ is secured and solid heat transfer is prevented.

Figure 7:
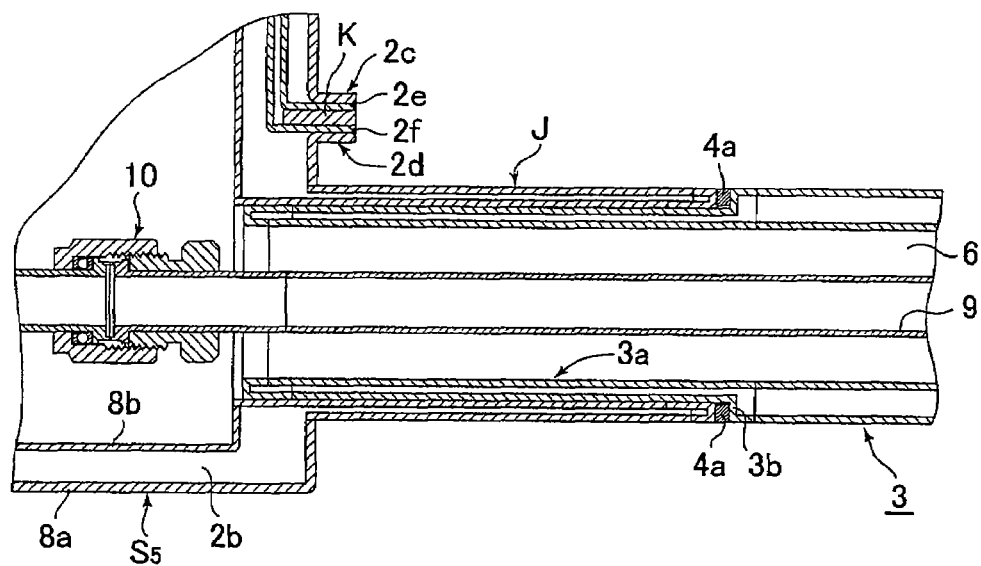
FIG. 7 is a partially enlarged perspective view showing the jointed part of a joint of the lower vacuum thermal insulating jacket and a vacuum thermal insulating pipe.
Figure 8:
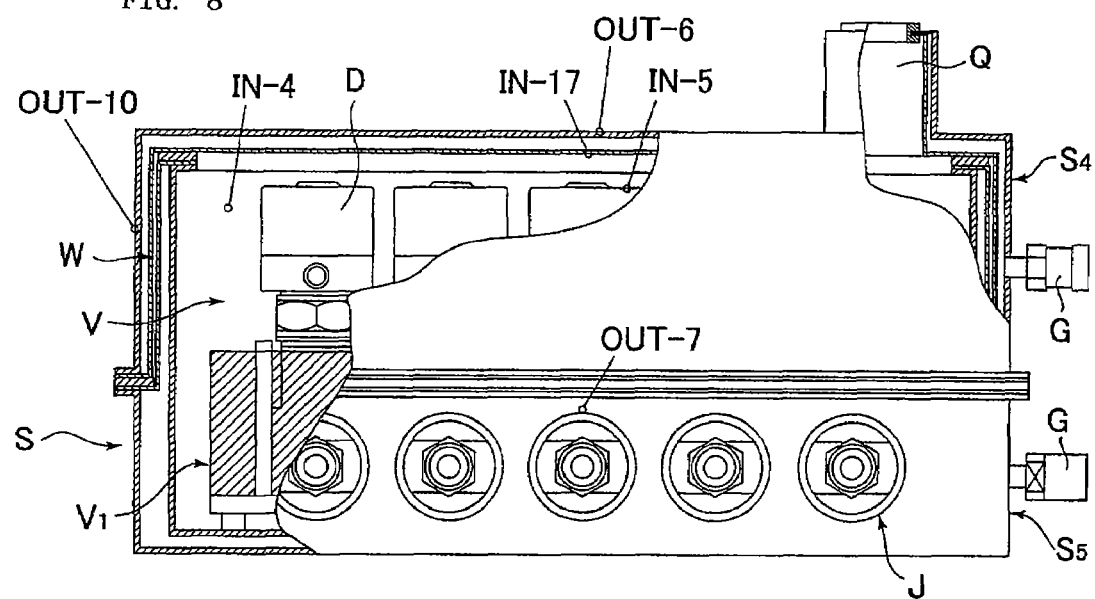
FIG. 8 shows the positions of measuring points in the thermal insulating performance test of the vacuum thermal insulating valve in accordance with the present invention (a front view).
Figure 9:
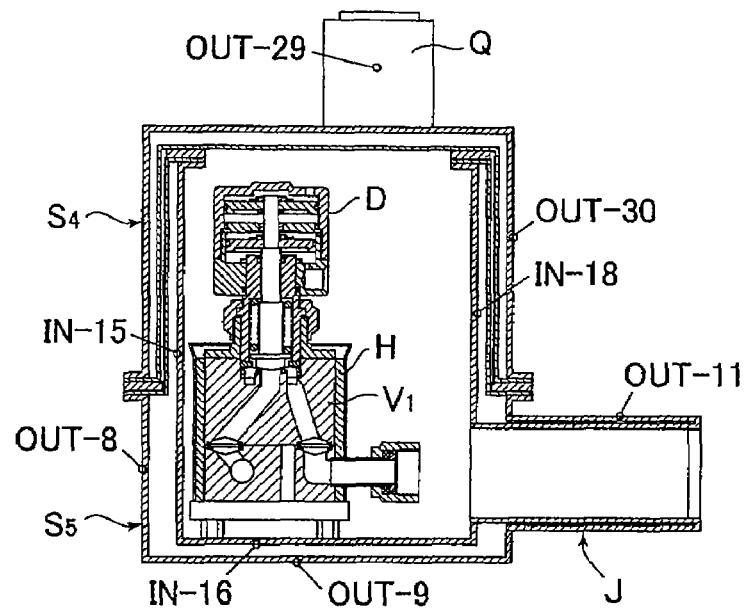
FIG. 9 shows the positions of measuring points in the thermal insulating performance test of the vacuum thermal insulating valve in accordance with the present invention (a left side view).
Figure 10:
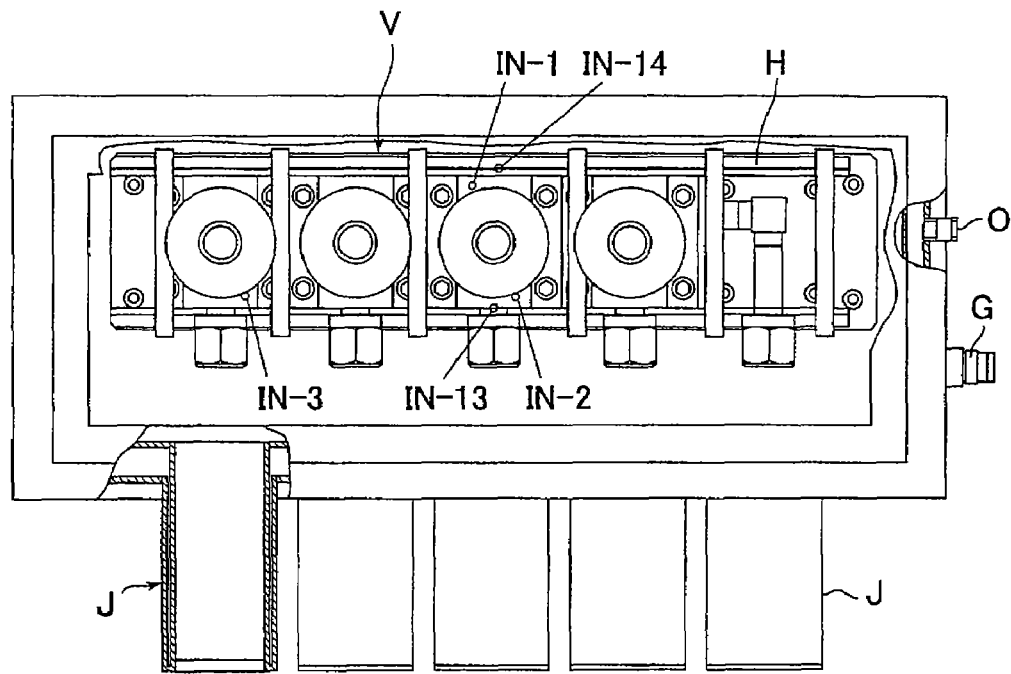
FIG. 10 shows the positions of measuring points in the thermal insulating performance test of the vacuum thermal insulating valve in accordance with the present invention (a plan view).
Figure 11:
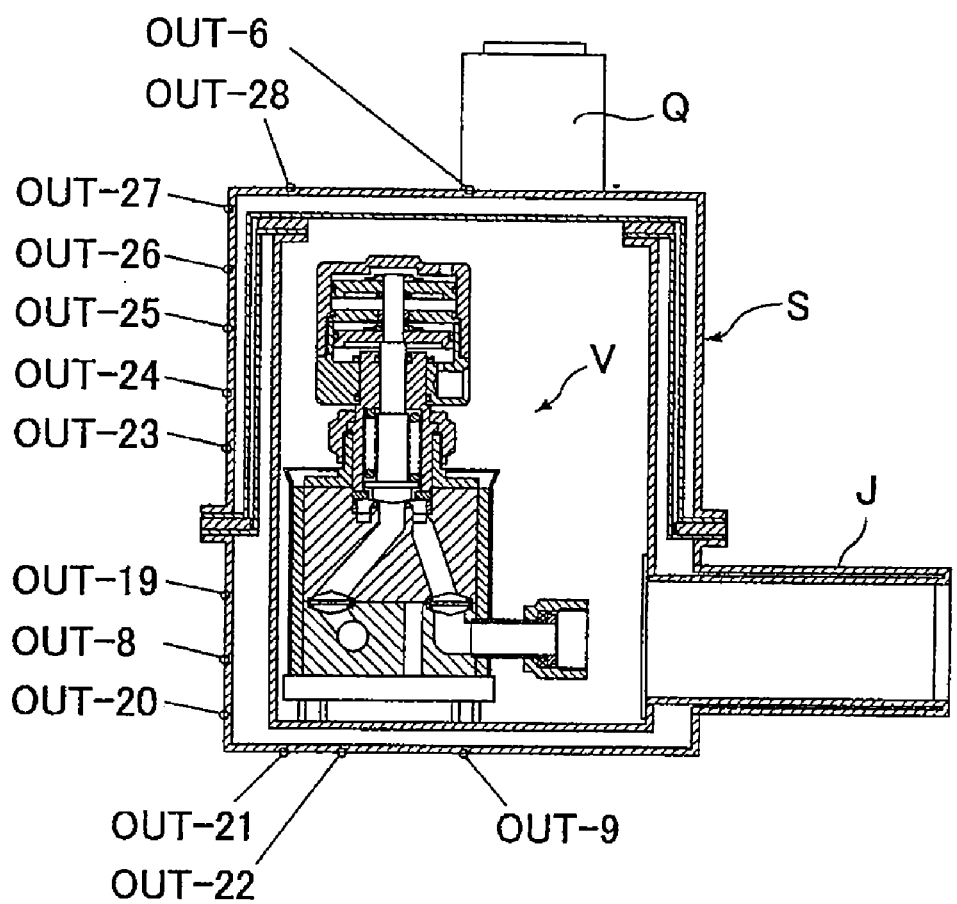
FIG. 11 shows the positions of measuring points in the thermal insulating performance test of the vacuum thermal insulating valve in accordance with the present invention (a left side view).

A 1.2 mm thick stainless steel plate is used for the vacuum thermal insulating pipe receiving part J, mounted on the side of the afore-mentioned lower vacuum jacket $S_5$, to form a so-called Bionett joint type vacuum thermal insulating part as constituted in FIG. 7. Specifically, it is constituted so that the receiving part J and the vacuum thermal insulating pipe 3 are hermetically connected in a manner so that part 3a, having a smaller diameter as the tip of the vacuum thermal insulating pipe 3, is inserted therein, and the tip face of the receiving part J and the step part 3b of the part 3a, which has a small diameter as the tip of the vacuum thermal insulating pipe 3, are contacted through the mediation of a thermal insulating-material made ring 4a. The length of the receiving part J is made to be approximately 100 mm.

In FIG. 7, 6 designates a heater, 9 a metal pipe, and 10 a pipe joint. Detailed explanation on the structure of the vacuum thermal insulating pipe receiving part J, pipe joint 10, and the like, is omitted herewith because they are well known.

Next, the thermal insulating characteristics test performed on the thermal insulating valve 1, in accordance with the present invention, and the test results are described. First, as shown in FIG. 8 to FIG. 11, a 5-gang type valve (a unit valve) V is housed in a vacuum thermal insulating box S of the breadth of approximately 400 mm, the height of approximately 190 mm, the depth of approximately 180 mm, and the length of the receiving part J is approximately 100 mm and the height of the overlapped part W of the upper and lower vacuum jackets $S_4$, $S_5$ is approximately 100 mm, and a plane heater H of 400 W (200 W×2) is fixed to the valve unit body $V_1$. Temperature measuring sensors (manufactured by OKAZAKI SEISAKUSHO CO., LTD.) are installed at the positions IN and OUT as shown in FIG. 8 to FIG. 11.

Next, the voltage determined by the actual measurement beforehand, which raises the temperature of the valve unit body $V_1$ approximately to 150° C., was applied to the plane heater H to find the relationship between the time of temperature sensor reading and the detected temperature.

Figure 12:
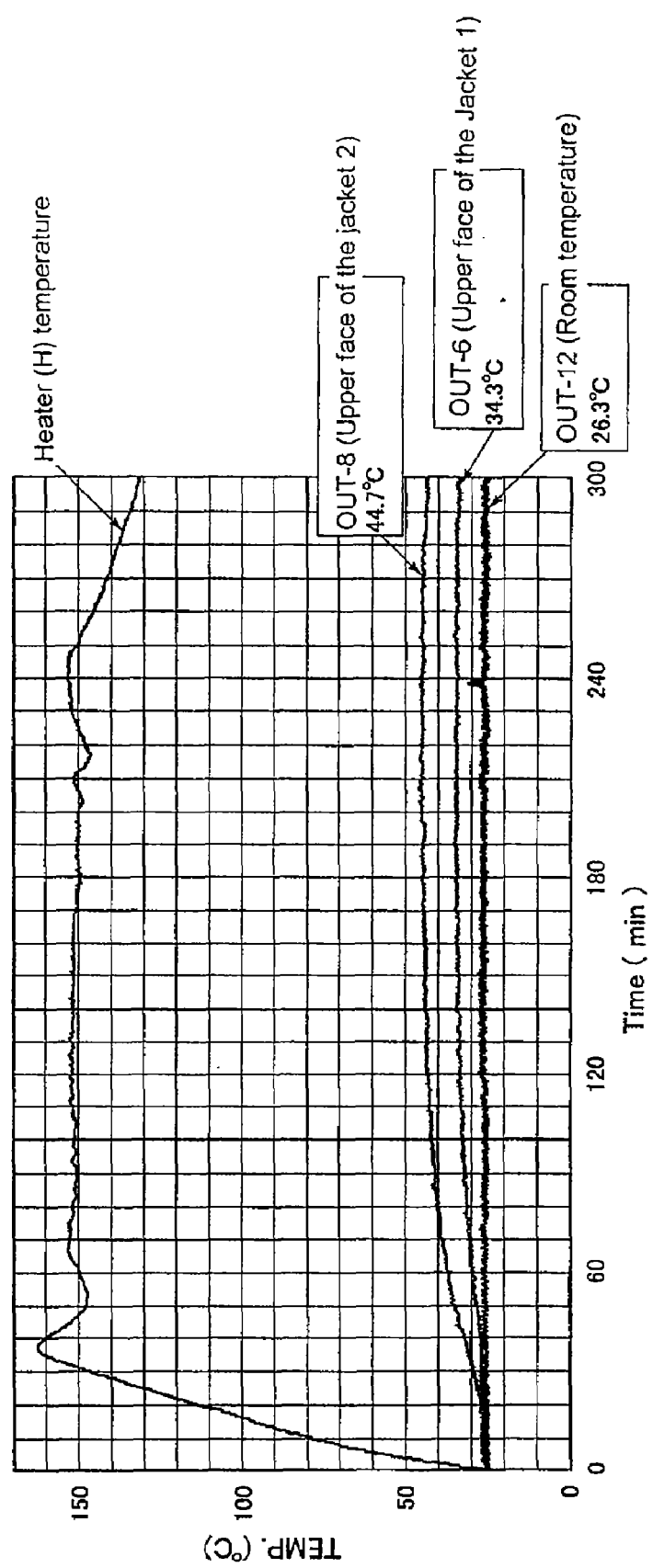
FIG. 12 is a curve showing the temperature distribution of the measuring points when the temperature of the valve unit body $V_1$ is made to be 150° C.

The results are as shown in FIG. 12. It has been learned that with a room temperature of approximately 26.3° C., the temperature (OUT-6 points) of the upper face side of the upper vacuum jacket $S_4$ may rise only to 34.3° C., and the temperature (OUT-8 points) of the side of the lower vacuum jacket $S_5$ may rise only to 44.7° C.

Figure 13:
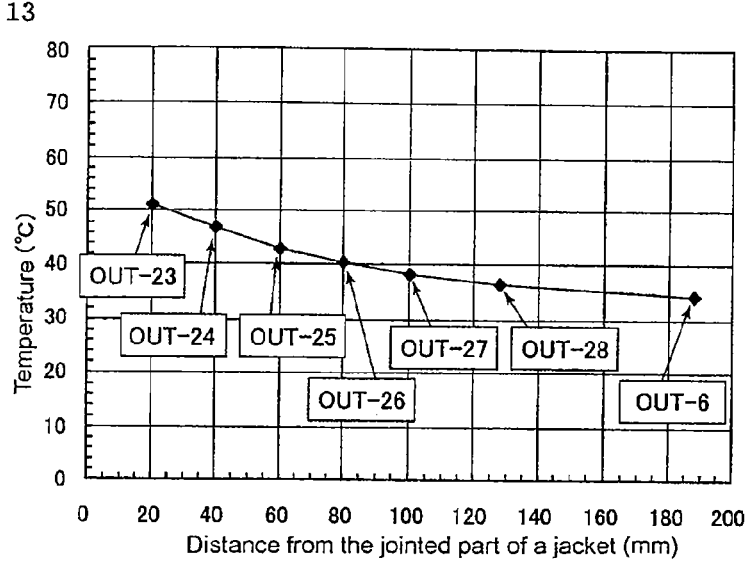
FIG. 13 is a diagram showing the relationship between the temperature of measuring points and the distance from the jointed parts of the jacket (i.e., an upper jacket).
Figure 14:
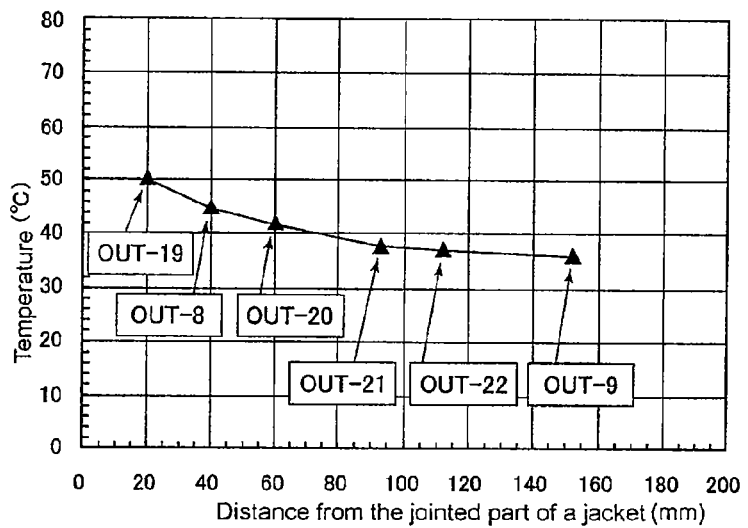
FIG. 14 is a diagram showing the relationship between the temperature of measuring points and distance from the jointed parts of the jacket (i.e., a lower jacket).

Next, the temperature of the valve unit body $V_1$ was stabilized to 150° C., and then, under this stabilized condition, the temperature of temperature measuring points (OUT) of the outside of the upper vacuum jacket $S_4$ and the lower vacuum jacket $S_5$ was measured. The results are shown in FIG. 13 and FIG. 14, which show the relationship between the afore-mentioned measurement values and the distances from the overlapped part (the jointed part) W of both vacuum jackets $S_4$, $S_5$.

In the case where the 2-way split type vacuum thermal insulating box S shown in FIG. 1 to FIG. 4 is employed, the input power required to keep the valve unit body $V_1$ heated to 150° C. was determined by the input voltage adjusting method. Two plane heaters of 200 W (100V·50Ω)×2 for the valve unit body $V_1$ were employed. According to the test results, the valve unit body $V_1$ was held at 150° C. with the input voltage of 37V. Accordingly, in this case, the input was $(37^2/50)\times 2 = 54.8$ W (the input was 213 W when a vacuum thermal insulating box was not employed). It is found that the vacuum thermal insulating performance is remarkably enhanced compared to the input power of 81 W in the case of the afore-mentioned 3-way split type vacuum thermal insulating box S shown in FIG. 22 to FIG. 25.

Embodiment 2

FIG. 15 shows another embodiment in accordance with the present invention. This second embodiment is constituted so that the upper and lower vacuum thermal insulating jackets $S_4$, $S_5$ are combined and fitted, and then their jointed parts 2c, 2d, in the shape of a brim, are pressed by the cross sectional u-shaped clip 5 through the mediation of the thermal insulating material layer K. Hermeticity of both jackets is enhanced by pressing brim-shaped jointed parts 2c, 2d with an appropriate distance, using the clip 5 to press; thus, consumption power to hold the afore-mentioned valve unit body $V_1$ to 150° C. is reduced from 54.8 W to 43.0 W. This enhancement has been verified through the experiment.

Embodiment 3

Figure 16:
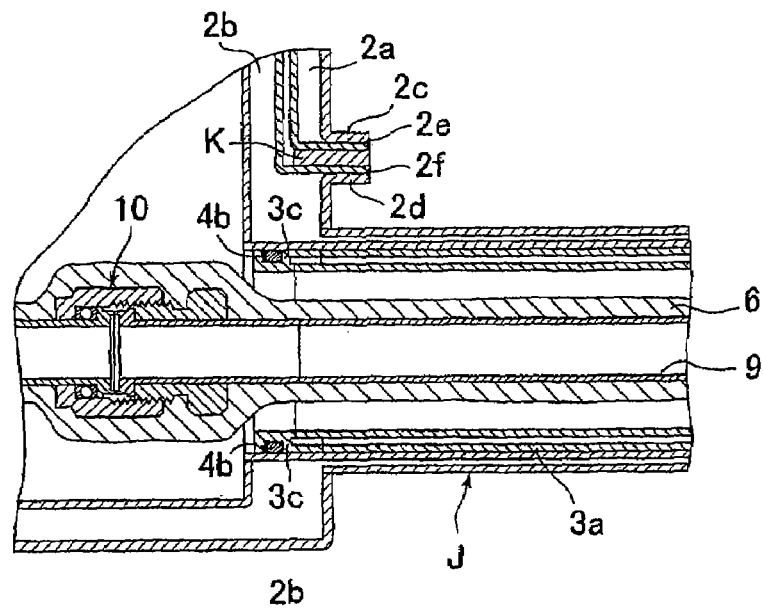
FIG. 16 is a partial cross-sectional view to show another example of the joint.

FIG. 16 further shows another embodiment in accordance with the present invention. This third embodiment is constituted so that the tip part of part 3a, provided with a smaller diameter of the vacuum thermal insulating pipe 3 for insertion into the receiving part J, is equipped with a step part 3c, to which a silicon rubber-made O-ring 4b is fitted. By achieving this construction, hermeticity between the tip part 3a of the vacuum thermal insulating pipe 3 and the inner wall face of the joint J is enhanced. Heat leakage inside the vacuum thermal insulating box S, toward the outside, is shut out at the heat source side, thus resulting in further improvements in thermal insulating performance.

The reason why a silicon rubber made sponge is employed as the afore-mentioned thermal insulating material layer K, or that a silicon rubber made thermal insulating material is used for the thermal insulating O-rings 4a, 4b, in accordance with the present invention is because they have both high heat resistance and excellent hermeticity. For this embodiment, the product made with the low polymer resin, Siloxane by SHINETSU POLYMER CO., LTD., is employed.

FEASIBILITY OF INDUSTRIAL USE

A vacuum thermal insulating valve, in accordance with the present invention, is mainly utilized with pipes in gas supply systems or vacuum exhaust systems with semiconductor manufacturing facilities or plasma generating apparatuses. However, the present invention is not limited to the aforementioned semiconductor manufacturing facilities and the like, but also may be utilized as constituent components for gas supply systems or gas exhaust systems used in chemical, pharmaceutical or food-processing industries and the like.

The invention claimed is:

1. A vacuum thermal insulating valve comprising:
   (a) valve comprising a valve body and an actuator; and
   (b) a vacuum thermal insulating box that houses the valve, the vacuum thermal insulating box comprises
      i. a square-shaped lower vacuum jacket equipped with a cylinder-shaped vacuum thermal insulating pipe receiving part on a side and an upper face that is made open; and
      ii. a square-shaped upper vacuum jacket hermetically fitted to the lower vacuum jacket from above and the square-shaped upper vacuum jacket has a lower face that is made open; and
      iii. a first jointed part formed by bending an inner wall and an outer wall of an upper end of the lower vacuum jacket toward an inside of the box in shape of a brim and a second jointed part formed by bending a center part of a height direction of the side of the lower vacuum jacket toward an outside of the box in shape of a brim, and further a third jointed part formed by bending an inner wall and an outer wall of a lower end of the upper vacuum jacket toward the outside of the box in shape of a brim, and both vacuum jackets are connected such that a vacuum thermal insulating side wall of the upper vacuum jacket is positioned toward a vacuum thermal insulating side wall of the lower vacuum jacket, and wherein the third jointed part of the lower end of the upper vacuum jacket and the second jointed part of the outer wall of the lower vacuum jacket are hermetically sealed by installing a first thermal insulating material layer, and a fourth jointed part formed by an inner wall of a ceiling part of the upper vacuum jacket and first jointed part of the upper end of the lower vacuum jacket is hermetically sealed by installing a second thermal insulating material layer.

2. A vacuum thermal insulating valve as claimed in claim 1, wherein the valve body is a unit made by a plurality of valve bodies that are integrally connected.

3. A vacuum thermal insulating valve as claimed in claim 1, wherein a heater is mounted on the valve body and the heater is a plane heater fixed to the valve body.

4. A vacuum thermal insulating valve as claimed in claim 3, wherein the plane heater is fixed to an outer surface of the valve body and the valve body further comprises an inner part comprising a valve seat and a valve seat part.

5. A vacuum thermal insulating valve as claimed in claim 1, wherein each thermal insulating material layer comprises a silicon sponge.

6. A vacuum thermal insulating valve as claimed in claim 1, wherein the outer wall of the upper vacuum jacket is 2 mm thick and the inner wall of the vacuum jacket is 1.5 mm thick, and the inner wall of the lower vacuum jacket is 2 mm thick and a lower part of the outer wall of the lower vacuum jacket is 2 mm thick and an upper part of a side wall of the outer wall of the lower vacuum jacket is 1.5 mm thick, and wherein the inner wall and outer wall of the upper vacuum jacket and the inner wall and outer wall of the lower vacuum jacket are made of stainless steel.

7. A vacuum thermal insulating valve as claimed in claim 1, wherein the vacuum thermal insulating pipe receiving part installed on the side of the lower vacuum jacket is a 50 mm to 150 mm long cylinder-shaped vacuum jacket made of a 2 mm thick stainless steel plate, and O-rings made of thermal insulating material are placed on a peripheral face of one end or both ends of a tip part of a vacuum thermal insulating pipe inserted into the vacuum thermal insulating pipe receiving part from outside, and the O-rings made of thermal insulating material are disposed between the vacuum thermal insulating pipe receiving part and the tip part of the vacuum thermal insulating pipe.

8. A vacuum thermal insulating valve as claimed in claim 1, wherein the second jointed part and third jointed part, in the shape of a brim, are disposed at side walls of the lower and upper vacuum jackets, respectively, and when combined in an opposite direction are pressed into an appropriate distance by a plurality of press-clips.

9. A vacuum thermal insulating valve as claimed in claim 1, wherein a height of an overlapped part that forms when the upper and lower vacuum jackets are combined forms a side wall of the vacuum thermal insulating box and is made to be more than 100 mm.

10. A vacuum thermal insulating valve as claimed in claim 1, wherein an inner wall face of vacuum thermal insulating spaces of the upper vacuum jacket and lower vacuum jacket undergoes heat treatment after plating.

* * * * *

UNITED STATES PATENT AND TRADEMARK OFFICE
CERTIFICATE OF CORRECTION

| | |
|---|---|
| PATENT NO. | : 7,673,649 B2 |
| APPLICATION NO. | : 10/597303 |
| DATED | : March 9, 2010 |
| INVENTOR(S) | : Tadahiro Ohmi et al. |

It is certified that error appears in the above-identified patent and that said Letters Patent is hereby corrected as shown below:

Claim 7, col. 12, line 27, please change "2 mm thick stainless steel plate" to -- 1.2 mm thick stainless steel plate --.

Signed and Sealed this
Seventeenth Day of May, 2011

David J. Kappos
*Director of the United States Patent and Trademark Office*